United States Patent
Li et al.

(10) Patent No.: US 12,497,373 B2
(45) Date of Patent: Dec. 16, 2025

(54) INTERMEDIATE COMPOUNDS USED FOR PREPARING BRIVARACETAM, PREPARATION METHODS FOR INTERMEDIATE COMPOUNDS, AND USE

(71) Applicant: SHANGHAI BOC CHEMICAL CO., LTD., Shanghai (CN)

(72) Inventors: Shangli Li, Shanghai (CN); Wei Guo, Shanghai (CN); Hailin Jing, Shanghai (CN)

(73) Assignee: Shanghai Boc Chemical Co., Ltd., Shanghai (CN)

( * ) Notice: Subject to any disclaimer, the term of this patent is extended or adjusted under 35 U.S.C. 154(b) by 960 days.

(21) Appl. No.: 17/628,706

(22) PCT Filed: Jul. 12, 2019

(86) PCT No.: PCT/CN2019/095681
§ 371 (c)(1),
(2) Date: Jan. 20, 2022

(87) PCT Pub. No.: WO2019/242780
PCT Pub. Date: Dec. 26, 2019

(65) Prior Publication Data
US 2022/0411391 A1     Dec. 29, 2022

(30) Foreign Application Priority Data
Jun. 19, 2018 (CN) .......................... 201810628635.4

(51) Int. Cl.
*C07D 307/33* (2006.01)
*B01J 23/72* (2006.01)
*C07D 207/267* (2006.01)

(52) U.S. Cl.
CPC ............ *C07D 307/33* (2013.01); *B01J 23/72* (2013.01); *C07D 207/267* (2013.01)

(58) Field of Classification Search
CPC ................................................... C07D 307/33
See application file for complete search history.

(56) References Cited

FOREIGN PATENT DOCUMENTS

| | | |
|---|---|---|
| CN | 105272897 A | 1/2016 |
| CN | 105646319 A | 6/2016 |
| CN | 106279074 A | 1/2017 |
| KR | 20090017316 A | 1/2017 |
| WO | 2018042393 A1 | 3/2018 |

OTHER PUBLICATIONS

Ok. T. et al. "Enantiomerically Pure Synthesis of ~-Substituted y-Butyrolactones: A Key Intermediate to Concise Synthesis of Pregabalin" J. Org. Chern., vol. 72. No. 19.Aug. 23, 2007 (Aug. 23, 2007). pp. 7390-7393.

*Primary Examiner* — David K O'Dell
(74) *Attorney, Agent, or Firm* — IPRTOP LLC

(57) ABSTRACT

The present disclosure provides intermediates used for preparing Brivaracetam, a preparation method and a use thereof, including an intermediate compound A and an intermediate compound B and a preparation method thereof, as well as a synthetic route for using the intermediate compound B to prepare Brivaracetam. The present technical solution can obtain high-quality and high-optical purity Brivaracetam and intermediates thereof, the proportion of Brivaracetam among the four optical isomers being greater than 99.5%. In addition, neither silica gel column for separation and purification nor expensive chiral high performance liquid chromatography for resolution is required, thereby avoiding cumbersome separation and purification steps, also avoiding waste of raw materials, reducing the production cost and making it more suitable for industrial production.

4 Claims, 3 Drawing Sheets

INTERMEDIATE COMPOUNDS USED FOR PREPARING BRIVARACETAM, PREPARATION METHODS FOR INTERMEDIATE COMPOUNDS, AND USE

CROSS REFERENCE TO RELATED PATENT APPLICATION

The present application is the US national stage of PCT/CN2019/095681 filed on 2019 Jul. 12, which claims the priority of the Chinese patent application No. 201810628635.4 filed on 2018 Jun. 19, which application is incorporated herein by reference.

TECHNICAL FIELD

The present disclosure relates to the field of drug synthesis, and in particular, to intermediate compounds used for preparing Brivaracetam and preparation methods for the intermediate compounds as well as a use thereof.

BACKGROUND

Brivaracetam, of which the chemical name is (S)-2-((R)-2-oxo-4-propylpyrrolidin-1-yl)butanamide, has a structural formula as follows:

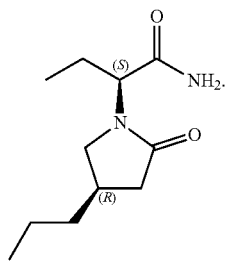

Brivaracetam is the latest third-generation anti-epileptic drug developed by Belgian pharmaceutical manufacturer UCB, which is a novel high-affinity ligand for synaptic vesicle protein 2A (SV2A), and also inhibits voltage-dependent sodium ion channels. In 2005, Brivaracetam was approved by the FDA and the EU for the treatment of myoclonic seizures. Multiple Phase III clinical trial studies including adjunctive treatment for partial-onset seizures are currently underway. The results show that Brivaracetam has a good efficacy for generalized seizures. The currently available synthetic routes for Brivaracetam include synthesis methods as shown below.

One synthetic route is that, as reported by Arnaud Schüle (Org. Process Res. Dev. 2016, 20, 1566-1575), a Brivaracetam intermediate (R)-4-propyl-dihydrofuran-2-one is synthesized with dimethyl propylmalonate as the starting material, for which the reaction route is as follows:

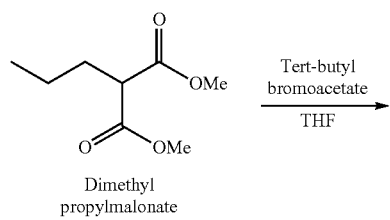

Dimethyl propylmalonate

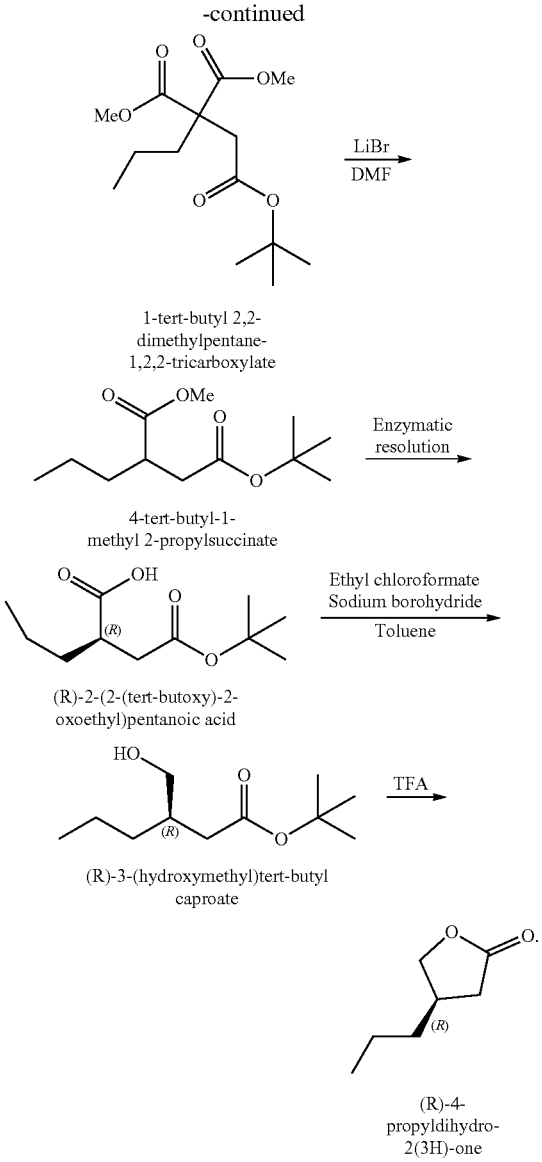

The disadvantages of this process are that the reaction conditions are relatively harsh, the yield is low, a large number of reaction steps are required, and the synthesis process requires the use of highly toxic ethyl chloroformate. This route is only suitable for laboratory scale production, and does not meet the purity and yield requirements in commercial scale production (kilogram level). Therefore, new synthetic routes are still being explored.

Another synthetic route is that, as reported by Benoit M. (J. Med. Chem. 2004, 47, 530-549), the reaction of 2(5H)-furanone with propyl magnesium bromide to get 4-propyl-dihydrofuran-2-one, the ring-opening reaction and chloride acetylation of trimethylsilyl iodide with furanone to get 3-(iodomethyl)hexanoyl chloride, then cyclization with (S)-2-aminobutanamide and separation and purification by passing through silica gel column to get (S)-2-(3-propylpyrrolidin-1-yl)butanamide, separation through chiral preparative equipment to get Brivaracetam, that is (S)-2-((R)-3-propylpyrrolidin-1-yl)butanamide, for which the reaction route is as follows:

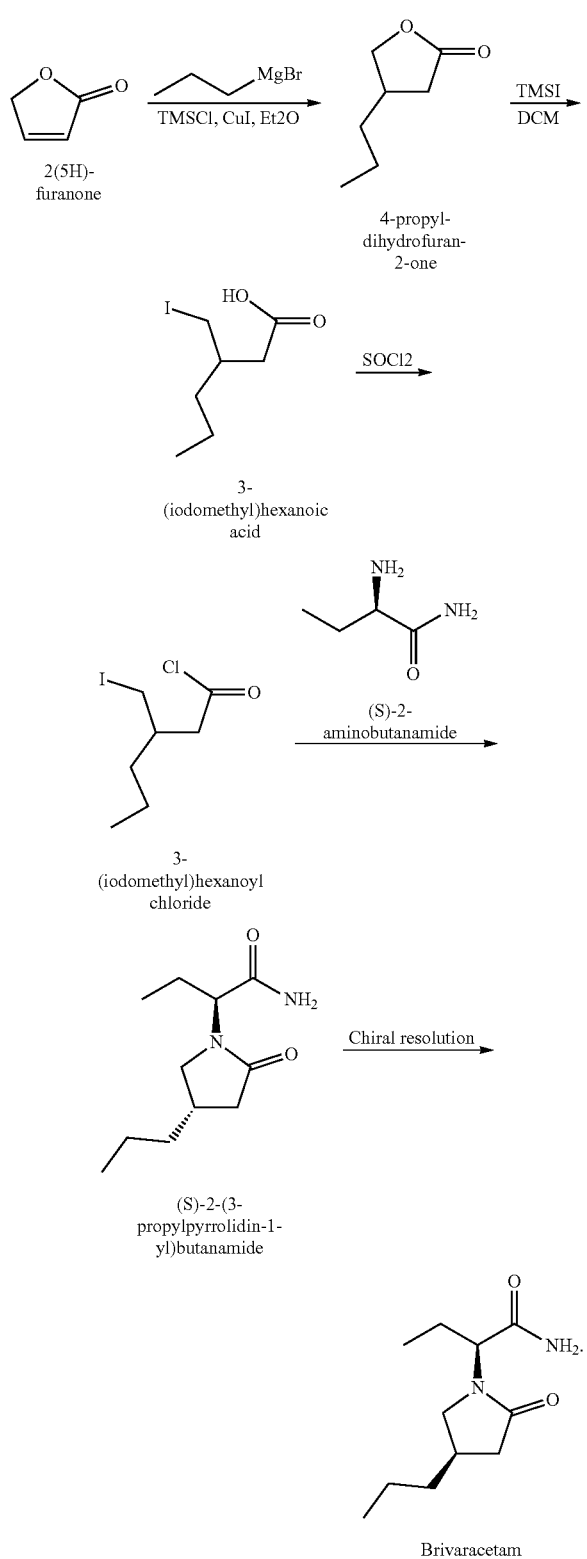

In this route, a silica gel column is required for separation and purification, and the final products also need to be separated and purified by a chiral preparative column. Therefore, the production cost of this route is high, and its industrial feasibility is poor.

SUMMARY

The present disclosure provides intermediate compounds used for preparing Brivaracetam and preparation methods for the intermediate compounds as well as a use thereof, in order to solve the problems in the preparation method of Brivaracetam, including harsh reaction conditions, high cost, difficulty in purification, and unsuitability for industrialized large-scale production.

To achieve the above and other related purposes, the present disclosure is realized through the following technical solutions.

The present disclosure firstly claims an intermediate compound A, the structural formula of the intermediate compound A is shown in Formula II:

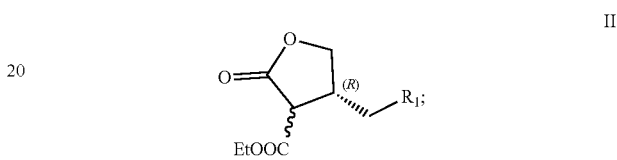

$R_1$ is selected from one of vinyl or ethynyl.

The present disclosure further provides a preparation method of the intermediate compound A, in which a compound with a structural formula as shown in Formula I is reacted with an unsaturated hydrocarbon metallic reagent to get the intermediate compound of which the structural formula is shown in Formula II, for which the reaction route is as follows:

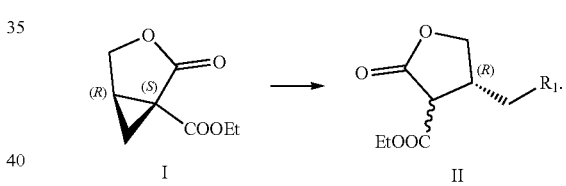

$R_1$ is selected from one of vinyl or ethynyl.

Preferably, the reaction is carried out under a copper-containing catalyst. More preferably, the copper-containing catalyst is selected from a combination of any one or more of cuprous chloride, cuprous bromide, cuprous iodide, cuprous cyanide or copper trifluorosulfonate.

Preferably, the molar ratio of the copper-containing catalyst to the compound of Formula I is (0.01-2):1. More preferably, the molar ratio of the copper-containing catalyst to the compound of Formula I is 0.8:1.

Preferably, the reaction medium in the above reaction is an organic solvent. More preferably, the organic solvent is selected from one or more of dichloromethane, tetrahydrofuran, diethyl ether, methyl tetrahydrofuran, methyl tert-butyl ether, toluene, xylene or dimethyl sulfide.

Preferably, in the above reaction, the molar ratio of the compound with a structural formula as shown in Formula I to the unsaturated hydrocarbon metallic reagent is 1:(2.5-3.5).

More preferably, the unsaturated metallic reagent is Grignard reagent. More preferably, the Grignard reagent is vinyl magnesium bromide or ethynyl magnesium bromide.

Preferably, in the above reaction, the reaction temperature is −78-35° C. More preferably, the reaction temperature is −45-35° C.

Preferably, in the above reaction, the reaction time does not exceed 5 h.

The compound with a structural formula as shown in Formula I in the present disclosure can be synthesized according to the report in the document J. Org. Chem, Vol. 72, No. 19, 2007 7393.

Preferably, post-processing steps are further included at the end of the above reaction, including extraction, drying, concentration and rectification. More preferably, the separation is as follows: firstly quenching the reaction solution with saturated ammonium chloride solution and then separating into layers to get an aqueous phase, and then extracting the aqueous phase with methyl tert-butyl ether. More preferably, the volume of the saturated ammonium chloride solution is at least 4, 5, 6, 7, etc times the volume of the compound of Formula I. More preferably, the volume of methyl tert-butyl ether is at least 1 time the volume of the compound of Formula I. Preferably, the concentration is distillation of the organic phase at reduced pressure.

The present disclosure further provides an intermediate compound B, the structural formula of the intermediate compound B is shown in Formula IV:

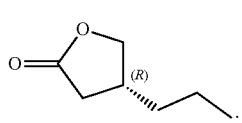

IV

The present disclosure further provides a preparation method of the intermediate compound B, including the following steps:

a) subjecting the intermediate compound of Formula II to deesterification reaction to get a compound with a structural formula of Formula III, for which the reaction route is as follows:

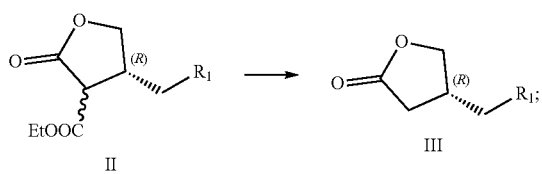

b) subjecting the compound with the structural formula of Formula III to hydrogenation reduction to get a compound with a structural formula of Formula IV, for which the reaction route is as follows:

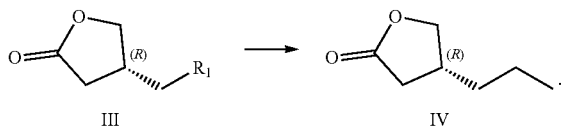

Preferably, $R_1$ is selected from one of vinyl or ethynyl.

Preferably, in step a), the intermediate compound of Formula II is subjected to deesterification reaction with lithium bromide.

More preferably, in step a), the molar ratio of the intermediate compound of Formula II to lithium bromide is 1:(1.0-1.5).

Preferably, in step a), the reaction system includes a solvent, and the solvent is an organic solvent. More preferably, the reaction solvent in step a) is any one or two of N,N-dimethyl formamide, dimethyl sulfoxide or N-methyl pyrrolidone.

Preferably, in step a), the reaction temperature is 90-160° C. More preferably, the reaction temperature in step a) is 120-140° C.

Preferably, the reaction time in step a) does not exceed 24 h.

Preferably, post-processing steps are further included in step a), including separation and concentration. More preferably, the separation is as follows: firstly quenching the reaction solution with saturated ammonium chloride solution and then separating into layers to get an aqueous phase, and then extracting the aqueous phase with methyl tert-butyl ether. More preferably, the volume of the saturated ammonium chloride solution is at least 5 times the volume of the compound of Formula II. More preferably, the volume of methyl tert-butyl ether is at least 2 times the volume of the compound of Formula II. More preferably, the concentration includes drying of the organic phase and distillation at reduced pressure to get an oily intermediate compound of Formula III.

Preferably, in step b), the compound with the structural formula of Formula III is reduced by hydrogenation in the presence of a catalyst to get a compound with a structural formula of Formula IV. The compound with the structural formula of Formula IV is (R)-4-propyl-dihydrofuran-2-one. The catalyst is a palladium-containing catalyst, e.g., palladium on carbon.

Preferably, a reaction solvent is included in step b), and the reaction solvent is an organic solvent. More preferably, the organic solvent is selected from one or more of tetrahydrofuran, methanol or ethanol.

Preferably, the reaction temperature in step b) is 30-60° C. More preferably, the reaction temperature in step b) is 35-40° C.

Preferably, in step b), the mass ratio of the catalyst to the compound with the structural formula of Formula III is 5%-10%.

Preferably, post-processing steps are further included at the end of the reaction in step b), which are used to purify and separate the product. The post-processing steps include filtering to remove the catalyst, and concentration. The concentration includes drying of the organic phase and distillation at reduced pressure.

The present disclosure further provides a use of a compound with a structural formula of Formula IV in preparing Brivaracetam.

Preferably, the method of preparing Brivaracetam is to obtain Brivaracetam by reacting the compound with the structural formula of Formula IV with (S)-2-aminobutanamide, for which the synthetic route is as follows:

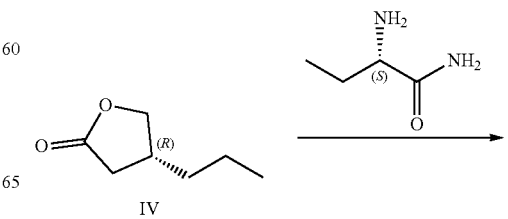

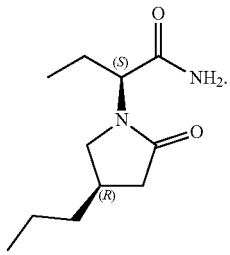

Preferably, the molar ratio of the compound with the structural formula of Formula IV to (S)-2-aminobutanamide or an acceptable salt thereof is 1:(1.0-1.5).

The method of preparing Brivaracetam further includes one or more of the following features. Preferably, the reaction temperature is 60-110° C. More preferably, the reaction temperature is 90-110° C. In the method of preparing Brivaracetam, temperature has an important effect on the progress of the reaction. Without changing other reaction conditions, the reaction time is 24 h, when the reaction temperature is 60° C., raw materials cannot react completely, and there is 80% remaining; while with the increase of the reaction temperature, the remaining raw materials become less.

Preferably, a post-processing step is further included at the end of the reaction for preparing Brivaracetam, which is used to purify the products by crystallization. The post-processing step can employ conventional methods. The solvent used in the crystallization of the present disclosure is preferably a mixed solvent of an ester solvent and an ether solvent, in which the volume ratio of the ester solvent to the ether solvent is 1:(3-12). More preferably, the volume ratio of the ester solvent to the ether solvent is 1:(4-6), in which range the purity and enantiomeric excess (ee) value can be effectively improved. Preferably, the ester solvent is selected from one or two of ethyl acetate and isopropyl acetate. The ether solvent is selected from one or two of methyl tert-butyl ether and isopropyl ether.

The above preparation methods provided in the present disclosure can obtain high-quality and high-optical purity Brivaracetam and intermediates thereof, the proportion of Brivaracetam among the four optical isomers being greater than 99.5%. In addition, neither silica gel column for separation and purification nor expensive chiral high performance liquid chromatography for resolution is required, thereby avoiding cumbersome separation and purification steps, also avoiding waste of raw materials, reducing the production cost and making it more suitable for industrial production.

DETAILED DESCRIPTION OF THE PREFERRED EMBODIMENTS

The implementation of the present disclosure will be illustrated through the following specific examples. Other advantages and effects of the present disclosure can be readily appreciated by those skilled in the art from the content disclosed in this specification. The present disclosure can also be implemented or applied through other different specific embodiments. Various details in this specification can also be modified or changed in various ways based on different viewpoints and applications without departing from the spirit of the present disclosure.

It should be noted that the process equipment or devices not specifically indicated in the following examples are all conventional equipment or devices in the art.

In addition, it should be understood that, the one or more method steps mentioned in the present disclosure does not exclude that there may be other method steps before and after the combined steps or other method steps may be inserted between these explicitly mentioned steps, unless otherwise stated. It should also be understood that, the combined connection relationship between one or more equipment/devices mentioned in the present disclosure does not exclude that there may be other equipment/devices before and after the combined equipment/devices or other equipment/devices may be inserted between the two explicitly mentioned equipment/devices, unless otherwise stated. In addition, unless otherwise stated, the numbering of the method steps is only a convenient tool for identifying the method steps, and is not intended to limit the order of the method steps or to limit the applicable scope of the present disclosure, and the change or adjustment of their relative relationship, if there is no substantial change to the technical content, should also be considered as the applicable scope of the present disclosure.

Figure 1:
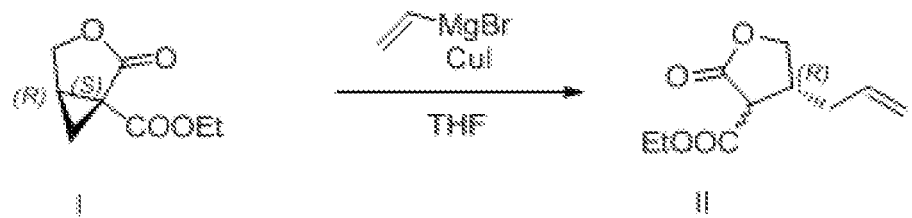
FIG. 1 is a diagram showing the preparation route of the intermediate compound II according to an embodiment of the present disclosure.
Figure 2:
FIG. 2 is a diagram showing the preparation route of the compound with the structural formula of Formula III according to an embodiment of the present disclosure.
Figure 3:
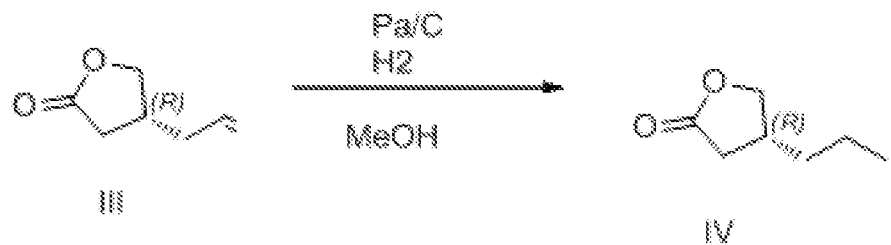
FIG. 3 is a diagram showing the preparation route of the compound with a structural formula of Formula IV.
Figure 4:
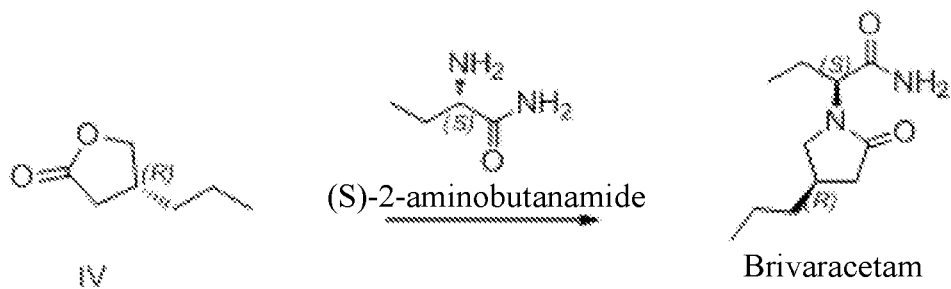
FIG. 4 is a diagram showing the preparation route of Brivaracetam.
Figure 5:
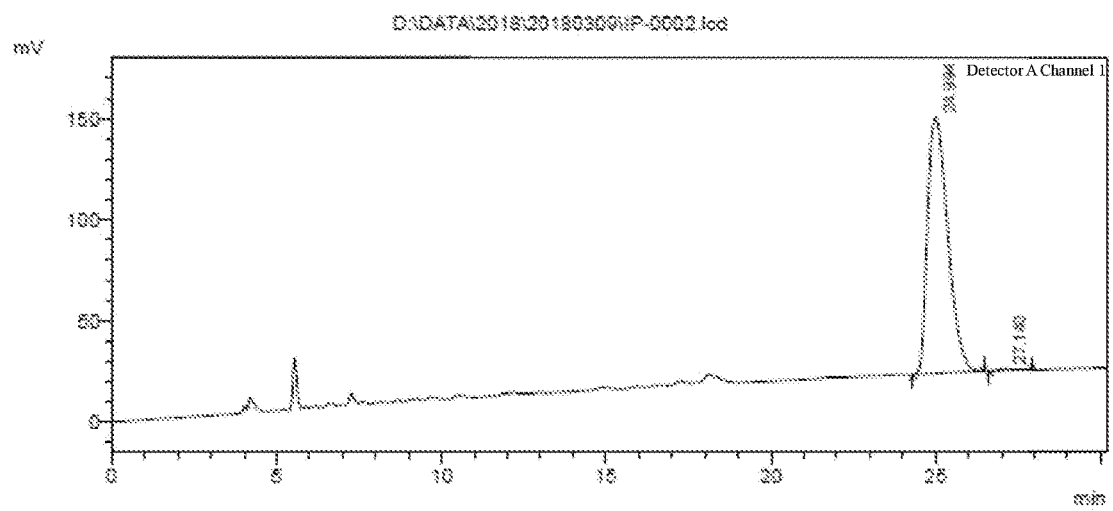
FIG. 5 shows the chiral mapping of the intermediate compound II according to an embodiment of the present disclosure.

In the exemplary embodiment of the present disclosure, Brivaracetam is synthesized through the route as shown in FIG. 1, of which the specific steps are as follows.

(1) Preparation of Intermediate Compound II

Under the protection of N2, into a mechanically stirred 10 L three-necked flask was slowly added a mixed solution of vinyl magnesium bromide and tetrahydrofuran (1 M, 10.6 L, 10.6 mol) and cooled to −40° C., into which was slowly added cuprous iodide (896 g, 4.7 mol) while controlling the temperature not exceeding −35° C. Upon the completion of addition, they were stirred at −45 to −35° C. for 2.0 hours, and then the compound with the structural formula of I (1.0 kg, 5.88 mol) and tetrahydrofuran (3.0 L) were dropwise added within 2.5 hours. While controlling the temperature not exceeding 35° C., they were reacted for 0.5 hours after dropwise addition. The reaction solution was slowly added into saturated ammonium chloride solution (5.0 L) and stirred for layering. The aqueous phase was extracted with methyl tert-butyl ether (2×1.0 L), the methyl tert-butyl ether layers were combined and concentrated to get yellow oil, 1.02 kg, and the yield was 88.4%.

The chiral analysis method for the product intermediate compound II in this step is as follows:
Model: LC-10A
Column: YMC Amylose-SA 4.6*250 mm 5 um Mobile phase: ethanol:n-hexane=5:95 (VN)
Detection wavelength: 214 nm
Flow rate: 0.8 ml/min
Isocratic elution: 35 min.

NMR characterization results of the product in step (1) are as follows: HNMR (400 MHz, CDCl$_3$), ppm, d 5.67 (1H, m), 5.11 (2H, m), 4.46 (1H, dd, J=9.01 Hz and 7.60 Hz), 4.21 (2H, q, J=7.12 Hz), 3.92 (1H, dd, J=8.99 Hz and 7.52 Hz), 3.22 (1H, d, 8.40 Hz), 3.01 (1H, m), 2.26 (2H, m), 1.26 (3H, t, J=7.16 Hz).

(2) Preparation of the Compound with the Structural Formula of Formula III

Into a mechanically stirred 10.0 L three-necked flask were added the intermediate compound of Formula II prepared above (1.3 kg, 6.5 mol), DMF (6.5 L), water (234 mL), LiBr (677.43 g, 7.8 mol), and then heated to 140° C. to react for 12 hours. The reaction solution was dropwise added into saturated ammonium chloride (6.5 L), into which was then added methyl tert-butyl ether (2.6 L) and stirred for layering. The aqueous phase was extracted with methyl tert-butyl ether (2.6 L). The combined methyl tert-butyl ether was dried over anhydrous sodium sulfate and concentrated to get yellow oil, which was distilled in vacuum at reduced pressure (0.32 mmHg, Teb: 80-85° C.) to get white and transparent oil, that was the compound with the structural formula of Formula III, 455 g, and the yield was 55.0%.

NMR characterization results of the product in this step are as follows: HNMR (400 MHz, CDCl$_3$), ppm δ 5.73-5.64 (m, 1H), 5.16-5.06 (m, 2H), 4.45-4.36 (m, 1H), 4.00 (dd, J=9.0, 5.8 Hz, 1H), 2.70-2.58 (m, 2H), 2.30-2.19 (m, 3H).

(3) Preparation of the Compound with the Structural Formula of Formula IV

Figure 6:
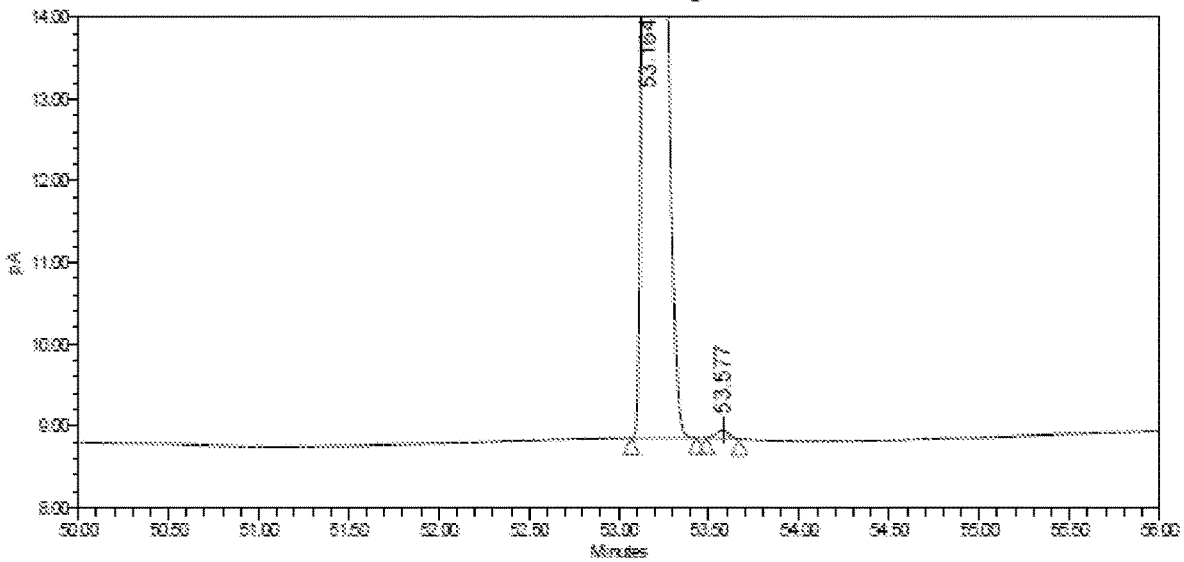
FIG. 6 shows the chiral mapping of the intermediate compound IV according to an embodiment of the present disclosure.

The compound with the structural formula of Formula III prepared above (100 g, 0.79 mol) was dissolved in methanol (1.0 L), into which was added 10% of palladium on carbon. Nitrogen replacement was performed for 3 times, and hydrogen replacement was performed for 2 times. The reaction was continued at 35° C. for 6 hours. Palladium on carbon was filtered out, and the reaction was concentrated to get white and transparent oil 96.5 g, the yield was: 95.0%, ee (percentage of enantiomeric excess)>99%, see FIG. 6.

The chiral analysis method for the product in this step is as follows:
Instrument: Agilent 7890A equipped with Auto sampler, solvent: n-heptane
Chromatographic conditions are:
Column: Lipodex E, 25 meters, 0.25 mm, 1 μm film thickness or equivalent Injector
Temperature of injector: 130° C.
Injection volume: 0.4 μL
Carrier gas: Nitrogen
Airflow: 1.0 mL/min
Split ratio: 20.0
Liner: Split
Times of needle washes: 3
Run time: 74 minutes
Diluent: n-heptane
Temperature programming:

| Temperature.slope (° C.) | Temperature (° C.) | Retention time (min) |
|---|---|---|
| 0 | 40 | 2 |
| 10 | 200 | 5 |

Detector: 220° C.
Hydrogen flow: 30 mL/min
Airflow: 300 mL/min
Makeup flow: 30 mL/min
Data sensitivity: 20 HZ/0.01 min.

NMR characterization results of the product in this step are as follows: HNMR (400 MHz, CDCl$_3$), ppm 4.42 (tapp, J=8.0 Hz, 1H), 3.93 (tapp, J=8.0 Hz, 1H), 2.65-2.54 (m, 2H), 2.19 (dd, J=16.3, 7.3 Hz, 1H), 1.48-1.44 (m, 2H), 1.40-1.30 (m, 2H), 0.95 (t, J=7.1 Hz, 3H).

(4) Preparation of Brivaracetam

Figure 7:
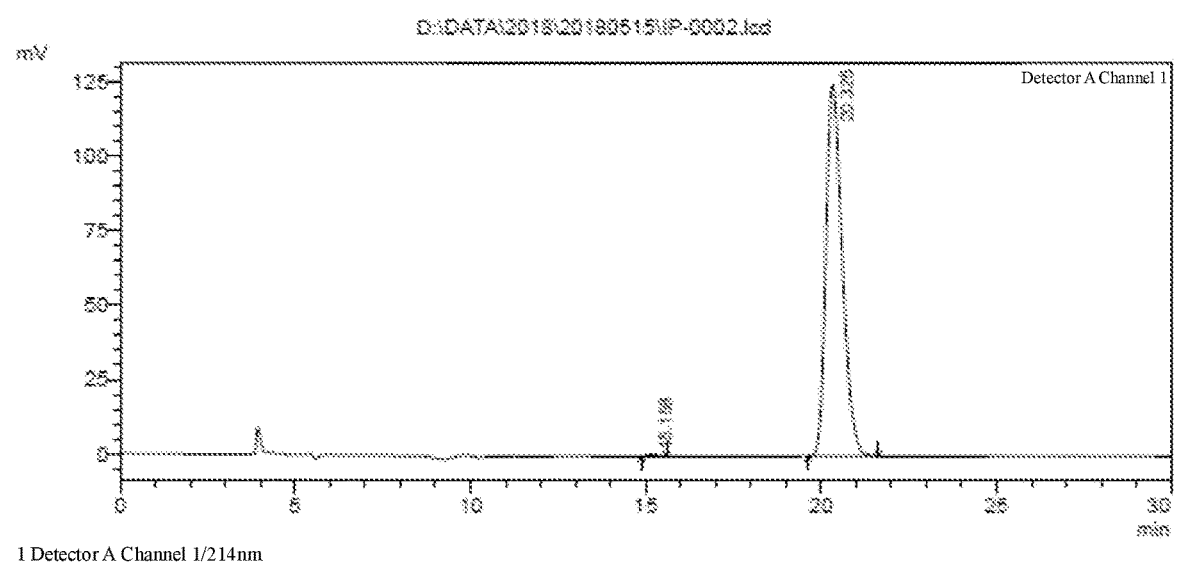
FIG. 7 shows the chiral mapping of Brivaracetam according to an embodiment of the present disclosure.

The compound with the structural formula of Formula IV prepared above (10 g, 0.078 mol) was dissolved in toluene (100 ml), into which were added (S)-2-aminobutanamide (11.9 g, 0.117 mol) and p-toluenesulfonic acid (1.34 g), heated to reflux to repel water, and reacted for 24 hours. It was added into 50 ml water, toluene was concentrated to get yellow oil. 5 ml isopropyl acetate and 25 ml methyl tert-butyl ether were added for crystallization to get 10 g white solid, the yield was: 60%, ee (percentage of enantiomeric excess)>99%, see FIG. 7.

The chiral analysis method for the product in this step is as follows:
Model: LC-10A
Column: CHIRAL AD-H 4.6*250 mm 5 um
Mobile phase: isopropanol:n-hexane=10:90 (VN)
Detection wavelength: 220 nm
Flow rate: 0.8 ml/min
Isocratic elution: 30 min.

NMR characterization results of the product in this step are as follows: HNMR (400 MHz, CDCl$_3$) ppm, δ 6.17 (1H, s) δ 5.34 (1H, s), δ 4.37-4.42 (1H, m), δ 3.47-3.55 (1H, m), δ 2.99-3.03 (1H, m), δ 2.45-2.52 (1H, m), δ 2.27-2.36 (1H, m), δ 2.02-2.16 (1H, m), δ 1.87-1.99 (1H, m), δ 1.63-1.73 (1H, m), δ 1.34-1.45 (2H, m), δ 1.29-1.36 (2H, m), δ ppm 0.85-0.90 (6H, m).

The above embodiments only exemplarily illustrate the principle of the present disclosure and its efficacy, and are not intended to limit the present disclosure. Anyone familiar with this technology can modify or change the above embodiments without departing from the spirit and scope of the present disclosure. Therefore, all equivalent modifications or changes made by those with ordinary knowledge in the technical field without departing from the spirit and technical ideas disclosed in the present disclosure should still be covered by the claims of the present disclosure.

What is claimed is:

1. A method for preparing Brivaracetam, comprising the following steps:
   (1) preparing an intermediate compound of Formula II: reacting a compound of a structural formula of Formula I with an unsaturated hydrocarbon metallic reagent, to obtain the intermediate compound of Formula II, wherein a reaction route is as follows:

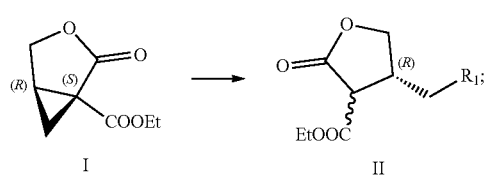

wherein R$_1$ is vinyl or ethynyl;
(2) preparing a compound with a structural formula of Formula III: subjecting the intermediate compound of Formula II to deesterification reaction to obtain the compound with the structural formula of Formula III, wherein a reaction route is as follows:

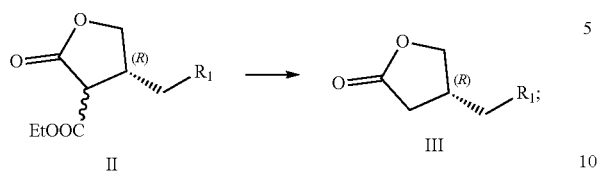

(3) preparing a compound with a structural formula of Formula IV: subjecting the compound with the structural formula of Formula III to hydrogenation reduction reaction to obtain the compound with the structural formula of Formula IV, wherein a reaction route is as follows:

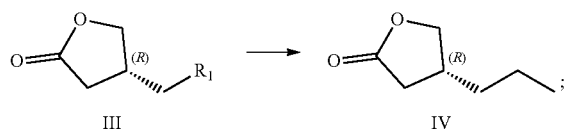

(4) preparing Brivaracetam: reacting the compound with the structural formula of Formula IV with(S)-2-aminobutanamide in toluene with p-toluenesulfonic acid acting as a catalyst to obtain Brivaracetam, then performing crystallization for purification, wherein a solvent used in the crystallization is a mixture of an ester solvent and an ether solvent, in which the volume ratio of the ester solvent to the ether solvent is 1:(4-6); wherein a synthetic route is as follows:

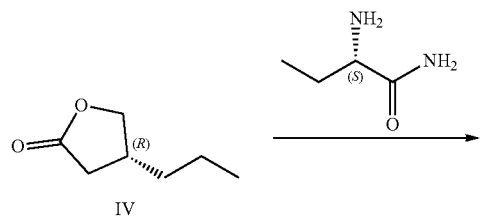

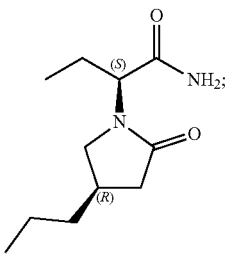

wherein the molar ratio of the compound with the structural formula of Formula IV to (S)-2-aminobutanamide is 1:(1.0-1.5); the reaction temperature is 90-110° C.

2. The method for preparing Brivaracetam according to claim 1, wherein step (2) further comprises one or more of the following:
   the intermediate compound of Formula II is subjected to deesterification reaction with lithium bromide;
   the molar ratio of the intermediate compound of Formula II to lithium bromide is 1:(1.0-1.5);
   the reaction temperature is 90-160° C.

3. The method for preparing Brivaracetam according to claim 1, wherein step (3) further comprises one or more of the following:
   the hydrogenation reduction reaction is conducted in the presence of a catalyst to obtain the compound with the structural formula of Formula IV;
   the reaction temperature is 30-60° C.;
   the mass ratio of the catalyst to the compound with the structural formula of Formula III is 5%-10%.

4. The method for preparing Brivaracetam according to claim 1, wherein step (1) further comprises one or more of the following:
   the reaction is carried out in the presence of a copper-containing catalyst;
   the copper-containing catalyst is any one or more of cuprous chloride, cuprous bromide, cuprous iodide, cuprous cyanide or copper trifluorosulfonate;
   the molar ratio of the copper-containing catalyst to the compound of the structural formula of Formula I is (0.01-2):1;
   the reaction temperature is −78° C. to 35° C.

* * * * *